United States Patent Office 2,733,220
Patented Jan. 31, 1956

2,733,220

MANUFACTURE OF SPHERICAL GEL PARTICLES

Charles Wankat, Brookfield, Ill., assignor to Universal Oil Products Company, Des Plaines, Ill., a corporation of Delaware No Drawing. Application November 17, 1952, Serial No. 321,046

11 Claims. (Cl. 252—448)

This application is a continuation-in-part of my copending application Serial Number 205,223, filed January 9, 1951, now abandoned.

This invention relates to the manufacture of spherical particles and more particularly to an improvement in the process of manufacturing inorganic oxide particles of substantially spherical or spheroidal shape.

A recent method for the manufacture of spherical particles of inorganic oxides entails dispersing droplets of a sol in a water immiscible suspending medium wherein the droplets set into hydrogel spheres. During use in the process, the suspending medium, particularly when operated at an elevated temperature, undergoes deterioration and becomes unsatisfactory for further use to produce substantially spherical gel particles. The interfacial tension between the suspending medium and the sol decreases during this use and results in particles which are not substantially spherical but instead are flat or ellipsoidal.

Another disadvantage resulting from the continued use of the suspending at elevated temperature in this process is that the suspending medium tends to be retained by the spheres to a greater extent than when using the fresh suspending medium. This results in a film of suspending medium on the gel particles and interferes with subsequent treatment of the gel particles with aqueous solutions. The film of suspending medium prevents efficient contact between the aqueous solution and the gel particles, with the result that either a poorer product is obtained or more aqueous solution is required to effect the desired treatment.

The present invention is directed to a novel method of retarding and/or preventing deterioration of the suspending medium and thereby to permit the use thereof for a considerably longer period of time than otherwise, with the resultant increased efficiency and improved economics of the sphere manufacture process.

In one embodiment the present invention relates to a process of forming inorganic oxide spheres by converting a sol of said inorganic oxide to a hydrogel within a water immiscible suspending medium, and maintaining an inert atmosphere above said suspending medium.

In another embodiment the present invention relates to a process of forming silica spheres by introducing droplets of silica sol into a hydrocarbon oil and therein causing the droplets to set to hydrogel spheres, wherein the interfacial tension between said sol and said hydrocarbon oil normally would decrease with use, and maintaining an atmosphere of nitrogen above said hydrocarbon oil in a forming zone to retard said decrease in interfacial tension.

In another specific embodiment the present invention relates to a process of forming alumina spheres by introducing droplets of alumina sol and an organic basic compound reactable therewith to form hydrogel particles into hydrocarbon oil maintained at an elevated temperature and therein causing the droplets to set to hydrogel spheres, and maintaining an atmosphere of nitrogen above said hydrocarbon oil.

From the heretofore description it is apparent that the novel features of the present invention may be utilized in the formation of hydrogel spheres from any suitable sol having the characteristic of setting into a gel. The sol may be formed from compounds of aluminum, silicon, titanium, zirconium, thorium, cerium, etc. The present invention is particularly applicable to the formation of gels comprising alumina or silica. The invention also may be utilized in the formation of cogels comprising two or more of these compounds.

The spheres may be utilized for any suitable purpose including dehydrating agents, contacting agents, catalysts, etc. and are particularly preferred for use in the preparation of catalysts for the conversion or organic compounds by impregnating or otherwise compositing therewith one or more active catalytic components. For example, in the manufacture of catalysts which are particularly suitable for use in the cracking of hydrocarbons, silica spheres may be impregnated or otherwise composited with an oxide of aluminum, magnesium, zirconium, vanadium, etc. or mixtures thereof. In the manufacture of catalysts which are particularly suitable for hydrogenation or dehydrogenation reactions, alumina spheres may be impregnated with an oxide of chomium, molybdenum, vanadium, tungsten, titanium, thorium, etc. or mixtures thereof.

In the manufacture of catalysts which are particularly suitable for the reforming of gasoline or naphtha in order to improve the antiknock properties thereof, alumina may be impregnated or otherwise composited with one or more of the metals or compounds of the noble metals, rare metals or those in the left hand column of Group 6 of the Periodic Table. The alumina is particularly suitable for compositing with platinum, with or without combined halogen, and used for the reforming of gasoline or naphtha.

In the manufacture of silica spheres, a suitable silica compound, such as an alkali metal silicate and particularly water glass, is commingled with a suitable acid, such as sulfuric acid, hydrochloric acid, etc. and the resultant mixture or sol is passed in finely divided form into the water immiscible suspending medium. In a preferred method, droplets of the sol are passed into a hydrocarbon oil bath. The concentration of water glass and acid are controlled so that the sol sets into firm hydrogel spheres. The suspending medium preferably is maintained at room temperature although in some cases elevated temperatures may be employed.

Any suitable suspending medium may be utilized in the manufacture of silica, alumina and the other inorganic oxides of the present invention. Preferred suspending medium include Nujol, kerosene, selected fractions of gas oil, etc. It generally is preferred to utilize a suspending medium having a density less than that of the sol so that the sol may be dropped into the top of the suspending medium and the spheres are withdrawn from the bottom thereof. However, it is understood that a suspending medium having a density higher than that of the sol may be employed and the sol, in this embodiment, would be introduced at the bottom of a confined body of the fluid, whereby the droplets will rise slowly to the surface of the suspending medium, settling into a hydrogel during the passage therethrough, and being withdrawn at the top of the suspending medium.

In accordance with the present invention an inert atmosphere is maintained above the suspending medium and, as will be shown by the following example, the use of this inert atmosphere serves to retard lowering of the interfacial tension between the sol and suspending medium, and thereby serves to prolong the useful life of the suspending medium to produce gel particles of substantially spherical shape. Further, this method serves to reduce the film of oil on the spheres and this in turn serves to facilitate subsequent washing of the spheres.

Referring again to the manufacture of silica spheres and utilizing hydrocarbon oil as the suspending medium, a particularly preferred method of removing the spheres from the forming zone is by means of a circulating stream of water positioned beneath the oil. The spheres are continuously withdrawn from the forming chamber and are directed to another zone wherein the spheres are washed with water to remove soluble compounds as, for example, sodium present in the water glass, acidic components introduced by the acid, etc. The method of the present invention will reduce the amount of oil retained on the spheres and thereby will improve the efficiency of the water washing treatment.

In the manufacture of alumina spheres, an alumina sol is commingled with a suitable organic basic compound reactable therewith to form gel particles, and the resultant mixture is then dispersed in finely divided form into the suspending medium. Any suitable alumina sol may be utilized in accordance with the present invention. In a preferred method the alumina sol is prepared from a chloride of aluminum, although it is understood that other aluminum salts, such as a nitrate of aluminum, etc. may be utilized but not necessarily with equivalent results.

Any suitable organic basic compound may be used in accordance with the present invention. Hexamethylene tetramine is particularly preferred. Other organic basic compounds include the reaction product of ammonia with acetaldehyde, propionaldehyde, etc. or ammonium acetate and preferably a mixture of ammonium acetate and ammonium hydroxide, the mixture having a pH of below about 8.5, etc.

The hexamethylene tetramine preferably is prepared as an aqueous solution containing from about 15% to about 40% by weight of hexamethylene tetramine for ease in handling and also because solutions within this range have been found to result in more firm gel spheres. The solution of alumina sol and the solution of hexamethylene tetramine are commingled and, in a preferred embodiment of the invention, droplets thereof are passed into the suspending medium. In general it is preferred to use equal volumes of the sol solution and of the hexamethylene tetramine solution. However, it is understood that the ratios of these solutions may vary considerably and thus range to about 5 volumes or more of one solution per 1 volume of the other solution.

The mixture of sol and hexamethylene tetramine solution preferably are dropped at room temperature or below into the suspending medium which is maintained at an elevated temperature which generally is above room temperature and preferably is from about 120° to about 220° F. and still more preferably of from about 190° to about 210° F. The volume of suspending medium employed should be sufficient to allow the required time for the droplets to set into firm hydrogel spheres.

As hereinbefore set forth, the oil used in the forming zone deteriorates with use and results in flat or ellipsoidal pellets. In accordance with the present invention, an inert atmosphere is maintained above the oil in the forming chamber. Any suitable inert gas may be utilized for this purpose, including nitrogen, saturated hydrocarbon gases including methane, ethane, propane and/or butane, helium, argon, neon, etc. Any gas which is inert under the conditions employed in the process may be utilized. In general nitrogen is prefered because of its ready availability and lower cost. Saturated hydrocarbon gases also are available in many localities and, therefore, advantageously may be employed, and these gases may in one embodiment of the invention, consist of or include pentanes and even hexanes which would be in gaseous state under the elevated temperature employed during the forming of the spheres.

In some cases it may be desired to circulate the oil from the forming zone into a temporary storage or other zone and, in such cases, it is preferred that the inert atmosphere also be maintained above the level of oil in the storage or other zones.

Maintenance of an inert atmosphere above the suspending medium may be effected in any suitable manner and preferably is at a pressure slightly above that employed in the forming, storage or other zones so that any leaks will be to the atmosphere instead of the reverse. This readily may be accomplished by introducing a continuous stream of nitrogen or other inert gas at a pressure of from about 2 to 10 pounds per square inch or more into the upper portion of the forming, storage or other zones.

In some cases the forming chamber may comprise a zone open at its top to the atmosphere and in such cases the introduction of the inert gas may be accomplished through the use of a plurality of conduits positioned just above the level of the suspending medium and, in turn, venting to the atmosphere. In other cases, closed zones may be employed and, in such cases, it generally is preferred to provide venting means in order to periodically or continuously vent the gases.

After treatment of the spheres in the manner herein set forth above, the spheres may be treated in any suitable manner. When used as adsorbent, contacting agent, etc., the spheres may be dried at a temperature of from about 200° to about 500° F. and then may be calcined at a temperature of from about 800° to about 1400° F. When utilized as a support or carrier for catalyst, the spheres may be impregnated or otherwise composited with other components in any suitable manner and then calcined as aforesaid. In some cases it is desirable to dry and calcine the spheres, composite with the other components, and then further dry and calcine the spheres. When composited with one or more of the metals or compounds in groups 4, 5, 6 and 8 of the periodic table, the resultant catalysts are suitable for use in cracking, reforming, hydrogenation, dehydrogenation, cyclization, desulfurization, etc. of hydrocarbons or other organic compounds.

The following example is introduced to illustrate further the novelty and utility of the present invention but not necessarily with the intention of unduly limiting the same.

*Example*

The suspending medium used in this example was a Pennsylvania light spindle oil having an API gravity at 60° F. of 33° and a boiling range of 640° to 739° F. The fresh oil had an interfacial tension against water of 28.8 dynes/cm. This oil had a useful life of only about 8 days for the manufacture of alumina spheres and then had to be discarded because the pellets no longer were spherical but became flat or ellipsoidal.

An accelerated test has been devised to evaluate the effect of additives to the suspending medium. This test comprises subjecting the suspending medium containing additive to 100 pounds per square inch of oxygen pressure at 212° F. for 16 hours. This accelerated test simulates the conditions encountered in the forming step of the alumina sphere manufacturing process but is more severe due to the high oxygen pressure and thereby serves to evaluate the various additives without requiring a long time run in the plant. The results obtained by this test correlate well with those obtained in actual plant operation.

The oil when tested in the manner described above for 16 hours had an interfacial tension against water of 12.3. When this test was continued for 35 hours, the interfacial tension of the oil dropped to 12.2.

Another series of tests were run in which 100 pounds per square inch pressure of nitrogen at 212° F. were used in place of oxygen, as described above. After 16 hours, the interfacial tension of the oil so treated was 29.3 and after 35 hours, the interfacial tension of the oil was 28.0.

It appears that an interfacial tension of about 20 dynes/cm. is critical and that oils having an interfacial tension of below about 20 are unsatisfactory in producing substantially spherical pellets, while those having an interfacial tension above 20 are satisfactory for this purpose. From the above data it is seen that maintaining the oil in an atmosphere of nitrogen served to prevent a decrease in the interfacial tension of the oil and, therefore, the oil will be satisfactory for use for a considerably long period of time.

I claim as my invention:

1. A process for producing oxide spheres which comprises dispersing droplets of an inorganic oxide sol in a body of hydrocarbon liquid, gelling the sol droplets within said body of hydrocarbon liquid to form hydrogel spheres, and during the setting of the droplets in the hydrocarbon liquid maintaining immediately above said body an atmosphere which is inert to said hydrocarbon liquid whereby to retard lowering of the interfacial tension between the sol and the hydrocarbon liquid.

2. The process of claim 1 further characterized in that said sol is a silica sol.

3. The process of claim 2 further characterized in that the inert atmosphere is nitrogen.

4. The process of claim 1 further characterized in that said sol is an alumina sol.

5. The process of claim 4 further characterized in that the inert atmosphere is nitrogen.

6. The process of claim 1 further characterized in that said inert atmosphere is nitrogen.

7. The process of claim 1 further characterized in that said inert atmosphere is a saturated hydrocarbon gas.

8. The process of claim 7 further characterized in that said hydrocarbon gas comprises methane.

9. The process of claim 7 further characterized in that said hydrocarbon gas comprises ethane.

10. The process of claim 7 further characterized in that said hydrocarbon gas comprises propane.

11. The process of claim 7 further characterized in that said hydrocarbon gas comprises butane.

References Cited in the file of this patent

UNITED STATES PATENTS

| Number | Name | Date |
|---|---|---|
| 2,506,316 | Pierce | May 2, 1950 |
| 2,505,895 | Heard | May 2, 1950 |
| 2,584,286 | Pierce et al. | Feb. 5, 1952 |